May 15, 1934.　　　A. STOLL　　　1,959,009
LOCKING MEANS FOR NUTS, SCREWS, AND WASHERS
Filed April 10, 1931　　2 Sheets-Sheet 1
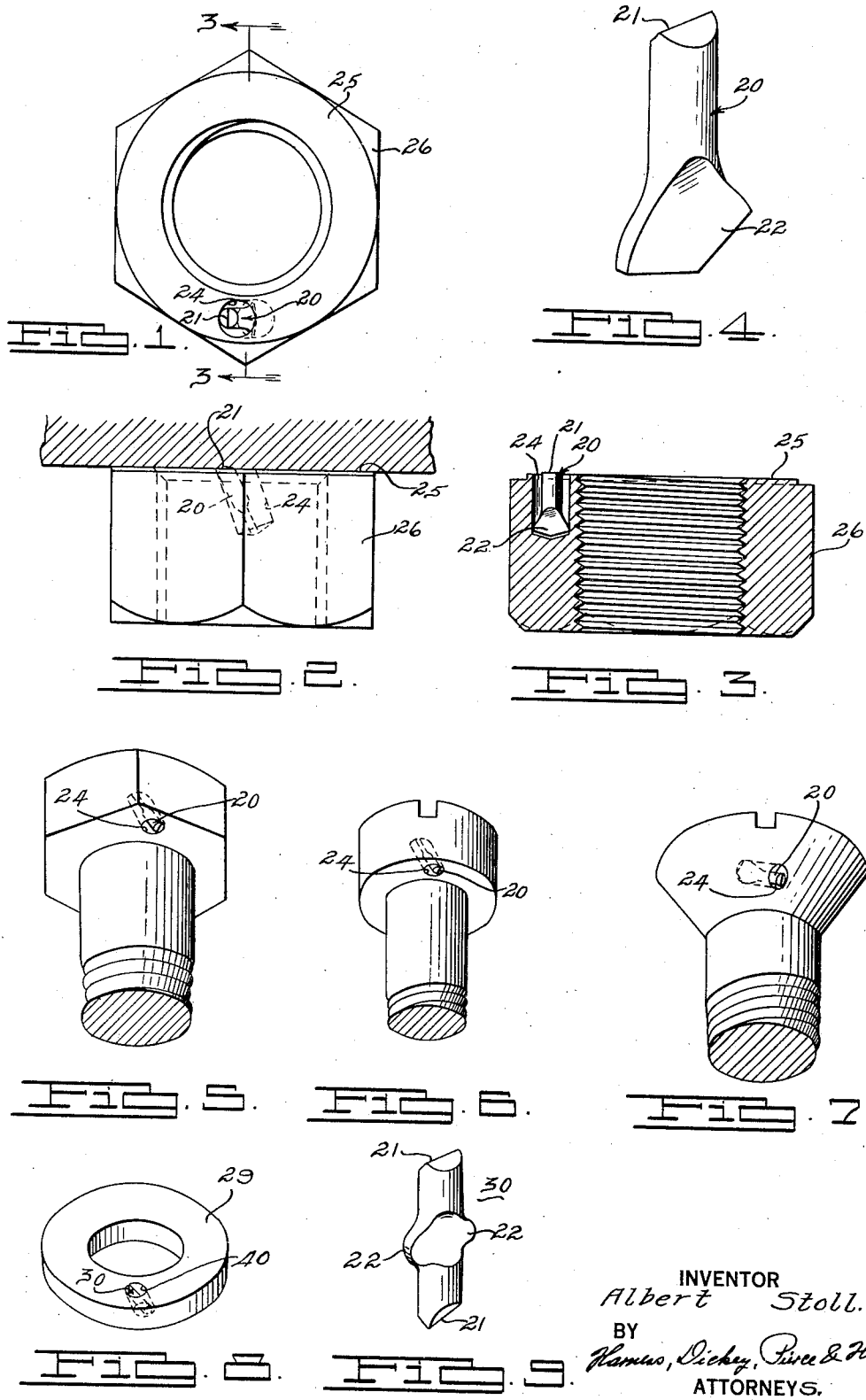
INVENTOR
Albert Stoll.
BY
Barnes, Dickey, Pierce & Hamm.
ATTORNEYS.

May 15, 1934.  A. STOLL  1,959,009
LOCKING MEANS FOR NUTS, SCREWS, AND WASHERS
Filed April 10, 1931  2 Sheets-Sheet 2
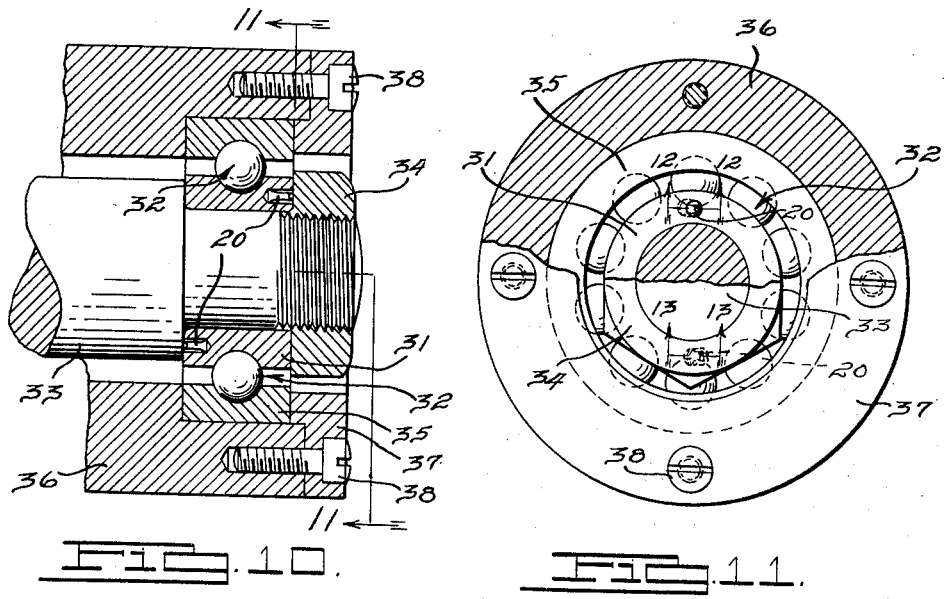
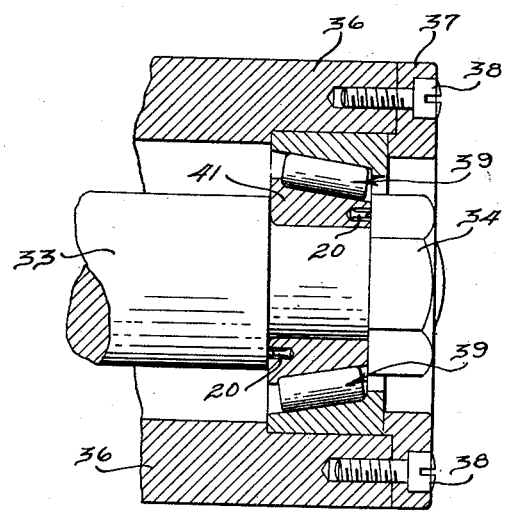
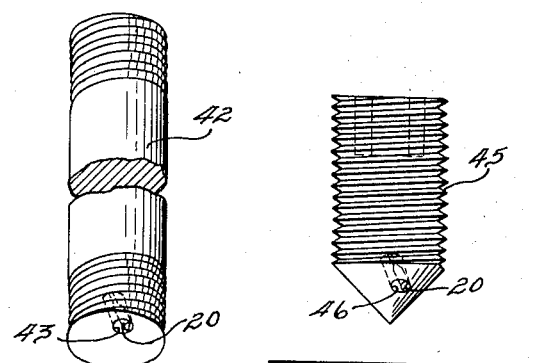
INVENTOR
Albert Stoll.
BY
Hamma, Dickey, Pierce & Hann.
ATTORNEYS.

Patented May 15, 1934

1,959,009

UNITED STATES PATENT OFFICE 1,959,009

LOCKING MEANS FOR NUTS, SCREWS, AND WASHERS

Albert Stoll, Detroit, Mich.

Application April 10, 1931, Serial No. 529,192

9 Claims. (Cl. 151—37)

My invention relates to locking nuts and particularly to means for retaining a nut, a screw, a washer or other similar body such as a hardened ball or roller bearing race, in predetermined clamped relation to a surface, against movement thereon in a direction opposite to that in which the clamping was effected.

Considerable ingenuity has been expended in the past in attempting to provide locking means for nuts, screws and washers to prevent them from becoming loosened relative to a member against which they had been tightly clamped. The most successful type of clamping means, the one mostly used in the art, is that effected by a split washer in which the ends are biased in opposite directions to prevent the turning of the surface of the nut relative to the surface against which the washer is clamped. The objection to this type of clamping means is primarily due to the fact that it is a distinct element which must be employed with a bolt and screw and which becomes lost, or is not available in a desired size, when the nut is removed and replaced on the screw. When a nut or screw is provided with a shoulder or recess for supporting a washer thereon, the washer may become separated from the nut or screw in which case they become substantially worthless as they depended upon the washer for a full clamping surface. A further objection to this type of locking means is caused by the necessity for increasing the length of the screw or stud in order to receive the additional thickness of the washer.

In practicing my invention, I provide a locking means for a nut, screw or washer of substantially any type, which in no way interferes with the clamping thereof on a member and which is effective for preventing the loosening of the screw, nut or washer thereon. The locking means is an integral part of the screw, nut or washer and the additional element heretofore employed, in the nature of a lock washer, is entirely eliminated.

Accordingly, one object of my invention is to provide a locking means for retaining two members against rotation which shall constitute an integral part of nuts, screws, washers or other members such as hardened ball or roller bearing races.

Another object of my invention is to provide a pivoted member in the body portion of a nut, a screw head, a washer, or other similar body, such as a hardened ball or roller bearing race which shall extend slightly beyond the engaging surface thereof, when the nut or screw is moved into clamping position with a member and which shall tilt into a position in which the ends extend an appreciable distance beyond the surface when the nut or screw is moved in a reverse direction.

A further object of my invention is to so provide a projecting member, in the body portion of a nut, screw, washer, or other similar body, such as a hardened ball or roller bearing race, that the angular movement of the nut or screw in its engaging thread causes the projecting member to extend outwardly of the engaging surface a comparatively greater amount than the amount of advancement of the nut or screw in the thread.

A still further object of my invention is to provide a cutting tool for a wire, which effects the retention of a nut, screw or washer in fixed predetermined relation with a surface, which shall cut the wire in such manner as to provide one end thereof with a knife edge while the end adjacent thereto is flattened and extended laterally in the plane of the knife edge of the first said end.

Numerous other objects and features of novelty of my invention will be either specifically pointed out or will become apparent when referring, for a better understanding of my invention, to the following description in conjunction with the accompanying drawings wherein:

Figure 1 is a plan view of a nut provided with a clamping member which embodies features of my invention, Fig. 2 is an elevational view of the structure shown in Fig. 1 with the nut in clamped relation to a member shown in section, Fig. 3 is a sectional view of the structure shown in Fig. 1, taken along the line 3—3 thereof, Fig. 4 is an enlarged, perspective view of the locking element shown in Figs. 1, 2 and 3, Figs. 5, 6 and 7 are views of a plurality of types of screws provided with a locking element which embodies features of my invention, Fig. 8 is a perspective view of a washer provided with a locking element which embodies features of my invention, Fig. 9 is an enlarged perspective view of the locking element shown in Fig. 8, Fig. 10 is a broken sectional view of a ball bearing having a raceway which is provided with locking means against which a clamping nut abuts.

Fig. 11 is an end view, partly in section and partly in elevation, of the structure shown in Fig. 10, Fig. 12 is a sectional view of the structure shown in Fig. 11 taken on the line 12—12 thereof, Fig. 13 is a sectional view of the structure shown in Fig. 11 taken on the line 13—13 thereof, Fig. 14 is a sectional view of the structure similar to that shown in Fig. 10 illustrating my invention as applied to a roller bearing, Fig. 15 is a broken perspective view of a stud embodying a feature of my invention, and Fig. 16 is a view, in elevation, of a set screw embodying a feature of my invention.

In practicing my invention, I provide a locking member 20 for a nut, screw or washer, which has a cutting edge 21 on one of its ends and which is flattened on its other ends to provide sidewardly projecting portions 22 in the plane of the cutting edge 21. I prefer to construct the member 20 from wire or rods, preferably from steel wire or rods of a hardness equivalent to that known as "music wire", and to form the cutting edge 21 and the flared ends 22 by a single shearing and flattening operation. A cutting tool is so provided that one edge shears the wire to effect the cutting edge 21, while the other end of the tool flattens the end of the adjacent member 20, during the shearing operation, to produce the projecting portions 22 thereof. In this manner an end 21 and projections 22 are formed on adjacent members 20 during each shearing operation of the wire or rod.

I provide a hole 24 in the abutting surface 25 of a nut 26, which inclines in a direction opposite to that in which the threads of the nut are inclined. That is to say, if the nut is advanced on a screw when it is turned in a clockwise direction, the hole 24 will be disposed at an angle to the left of a vertical plane and if the nut is provided with a left handed thread, the hole 24 will be disposed at an angle to the right of a vertical.

The diameter of the hole 24 and its inclination is such as to prevent the locking member 20 from moving beyond a vertical position relative to the nut. When the size of the wire and the diameter of the hole is so related, the flared portions 22 tightly engage the sides of the hole 24 and retain the member 20 in pivotal relation therewith. When the nut is screwed against a member, the cutting edge 21 of the member 20 is tilted away from the vertical against the side of the hole 24 to only slightly engage the surface of the member against which the nut is jammed.

The clamping member 20 is of such length that its angular movement from one side of the hole 24 to the opposite side thereof, projects its cutting edge 21 beyond the surface 25 a considerably greater distance than the nut 26 moves laterally on the thread while effecting the angular movement of member 20. In this construction any reverse movement of the nut 26 will cause the sharp edge 21, of the member 20, to dig deeper into the surface of the member against which the nut is clamped to thereby more securely lock the nut into fixed relation therewith as the nut is continued to be turned in a reverse direction.

A considerable application of force is required to remove the nut from the screw, the first application being substantially less than that required immediately thereafter as the member 20 becomes tilted against the surface of the member 24. Continued movement, however, withdraws the nut from the abutting surface, as it is turned on the thread, to thereby withdraw the end of the member 20 from engagement therewith. The top portion of the metal, which was distorted by the cutting end 21 of the member, is then sheared off by the cutting edge to smooth the surface of the abutting member and to permit the nut to be easily removed thereafter.

Any number of the locking members 20 may be employed throughout the periphery of a nut, depending upon the thickness of its body portion. A nut having a reduced body portion could only support a member 20 of reduced cross section, in which case two or more of the engaging members would probably be provided.

In Figs. 5, 6 and 7, I have shown a hexagon headed screw, a filister headed screw and a flat headed screw, respectively, provided with a locking member 20 which is supported in a hole 24 thereof. The locking member 20 is disposed therein in the same manner as it was retained in the hole 24 of the nut 26, which permits the locking member 20 to engage the surface abutting against the head of the screw.

When a washer 29 is to be employed between a nut and an abutting surface, I provide a locking member 30 therefor, which is similar to the locking member 20 with the exception that it is provided with a double cutting edge 21, as shown more clearly in Fig. 9.

Each end of the locking member 30 is provided with a cutting edge 21 and the central portion thereof is provided with flat projecting side portions 22 which are constructed in a somewhat similar manner as the flared portions 22 of the member 20, above referred to. The projections 22 engage the medial portion of a sloping hole 40 provided in the washer 19, which is disposed at an angle in the vertical with relation to the screwing of nuts thereagainst, in the same manner as the hole 24 above referred to, is related to the thread of a screw or nut.

When the washer is substantially of the same diameter as that of the nut, the locking member 20, may be omitted from the nut in which case the nut is locked to the washer and the washer locked to the abutting member by the ends 21 of the clamping member 30. In this construction if the nut tends to move on the washer, the lower cutting edge 21 prevents its movement in a manner referred to herebefore with regard to nuts provided with the locking member 20, and if the locking member and washer attempt to move as a unit relative to the abutting surface, the upper cutting end 21 of the member 30 will engage the surface in the same manner as that pointed out hereinabove with regard to the nut 26.

To provide a greater flexibility between the engagement of the cutting ends on the opposite sides of the washer, it is within the purview of my invention to provide a plurality of the clamping members 20 shown in Fig. 4, on one or both sides of the washer 29. In this construction the members 20 on one side of the washer will lock the nut while the members 20 on the opposite side thereof will lock the washer to the abutting surface. The member 20 on the outside of the washer may be omitted in which case the member 20 of the nut will retain the nut against rotation relative to the washer.

When a washer, having a diameter considerably greater than that of the nut or the screw head is employed for the purpose of covering an aperture, I provide one or more of the members 20 on the outer edge of the inner surface of the washer for engagement with the abutting surface about the aperture and provide one or more of the locking members 20 on the inner edge of the outer surface or on the underside of the screw head or nut, which is engageable with the washer. The nut or screw is in this manner clamped to the washer in locking engagement therewith while the washer is in locking engagement with the abutting surface through the locking member 20 of the washer.

As a further extension of the utility of applying the locking member 20 directly to a washer, I have illustrated in Figs. 10 to 14 inclusive the mounting of the locking members 20 in the raceways of ball or roller bearings to prevent the clamping nuts from becoming loosened on the thread or the raceway revolving relative to the support. In the figures I have shown a bearing 32 clamped to the shouldered end of an arbor 33 by a nut 34, the outer race 35 of the bearing being retained in a shoulder member 36 by an annular flanged member 37 which is supported on the member 36 by bolts 38. The inner raceway 31 rotates with the arbor 33 during which movement the nut 34 is prevented from becoming loosened on the threads thereof by the plurality of locking members 20 which are positioned in the ends of the raceway 31. The raceway 31 functions as a washer wherein locking members 20 engage respectively a shoulder on the arbor 33 and the clamping surface of the nut 34 to prevent the rotation of the nut. Any number of the members 20 may be employed and for the purpose of illustration I have shown a single locking member in each of the end surfaces of the raceway.

The angular disposition of the locking members are shown in Figs. 11, 12 and 13 to be such that the locking member 20 functions as a wedge between the nut engaging surface and the raceway to prevent the reverse rotation of the nut 34 after it has been screwed thereagainst. Similarly the locking member 20 provided on the inner edge of the raceway 31 constitutes a wedge between the shouldered surface of the arbor 33 and the raceway to likewise prevent the reverse rotation of the raceway and the nut relative to the arbor 33. The inner locking member prevents the reverse rotation of the raceway 31 while the locking member on the outer surface of the raceway prevents the reverse rotation of the nut 34 and in this manner the nut 34 and raceway 31 are retained in fixed clamped position relative to the arbor 33.

In Fig. 14 I have shown a bearing 39 which is similar to the ball bearing 32 illustrated in Fig. 10, 11, 12 and 13 with the exception that the bearing is of the roller type, the inner raceway 41 thereof being provided with locking members 20 positioned in the body thereof in the same manner as the locking members 20 were positioned in the raceway 31 and which function in the same manner for retaining the nut 34 in clamped relation to the spindle 33.

In Fig. 15 I have shown a stud 42 which is mountable in a threaded hole in a member and which is provided with a locking member 20 supported in an aperture 43 in its end which is angularly disposed in offset relation to the center of the stud. The locking member is pivotally mounted in the aperture in a manner similar to that above referred to, in order to permit the tightening of the stud against the bottom surface of the hole as the end of the locking member 30 engages the bottom surface substantially at the end of the clamping movement. When the stud is to be screwed outwardly from the threaded hole the initial rotation thereof causes the locking member 30 to be tilted to the opposite side of the aperture and in this manner to extend a considerable relative distance beyond the end surface of the stud to dig into the surface of the bottom of the hole to thereby resist the rotational movement of the stud. The stud is in this manner, prevented from becoming loosened in the hole and a positive force is required to effect its removal.

In Fig. 16 I have shown a similar locking member 20 mounted in a set screw 45 provided with a recess on one end which is engageable by a wrench (not shown) while the other end is provided with a tapered surface which engages a similar tapered surface in a member which is to be clamped by the set screw. The locking member 20 is disposed in the tapered end of the set screw in an aperture which is angularly positioned in the body portion thereof. The locking member 20 is tiltable in the hole 46 to project only slightly from the surface when the set screw is screwed against a member and which extends a considerably greater distance therefrom when the set screw is initially rotated in an opposite direction to be projected in the body portion of the member to thereby prevent the reverse rotation of the set screw 45 in the presence of anything but a positive force for effecting its removal.

The locking member has a considerable large range of application, being supportable on any member having a body of sufficient thickness to permit a small hole to be drilled therein. I therefore do not intend to limit the scope of my invention to the particular members illustrated and described herein, as my invention may be applied to any member having a surface which is engaged by the surface of another member through the medium of a thread.

The locking member is exceedingly economical of manufacture and by having the locking member pivotally supported in the body portion of the member to be locked, absolute reliability from separation of the locking member and the carrying member is assured. The locking member is applicable to a carrying member of any type, no matter how constructed, and may be attached, for example, to a punched nut as well as to one of the so called "milled from the bar" type.

The locking member functions just as effectively when mounted parallel to the axis of the carrying member as when disposed angularly thereto and for this reason when it is impossible to drill a hole in the head of a screw in parallel relation to the axis thereof, the hole may be drilled at an angle to the center line when disposed in angular relation to a plane therethrough, for effecting the clamping of the screw in the same manner as that referred to hereinabove.

It will thus be seen that I have provided a locking member for nuts, screws, washers, raceways for bearings and the like which effectively retain them in predetermined clamped position on a member. The locking member is an integral portion of the nut, screw, washer or like member, being retained thereon by the engagement of the extended sides of the locking member with the surface of a hole which has been disposed in angular relation to the threads of the screw. The locking member is constructed from rods or wires which are sheared to provide cutting edges on one end of one member and flat projections on an adjacent member during a single operation. When a locking member is provided for a washer, a single member may be employed which projects from either side thereof and which is available for clamping a nut to the washer and the washer to an abutting surface.

While I have described and illustrated several embodiments of my invention, it will be apparent to those skilled in the art that various changes, omissions, additions, and substitutions may be made therein without departing from the spirit and scope of my invention, as set forth in the accompanying claims.

I claim as my invention:

1. A locking member for a nut having a knife edge on one end and projections on the opposite end, said projections being pivoted in the body portion of the nut and limited in angular movement to one side of a plane extending through said pivoted projection and perpendicular to the engageable surface of said nut, said knife edge projecting from the engageable surface of the nut when disposed in a position furthermost from said plane.

2. A plurality of locking members for a nut, each having a knife edge on one end and projections on the opposite end, said projections being pivotally disposed in the body portion of the nut in such manner as to have the knife edges extend from the engageable surface of the nut.

3. A plurality of locking members for a nut, each having a knife edge on one end and projecting portions on the opposite end in the plane of said knife edges and pivotally disposed for angular movement in the body of the nut and supported by said projecting portions and having the knife edges extending from the engageable surface thereof.

4. A plurality of locking members for a nut, each having a knife edge on one end and projections on the opposite end and pivotally mounted in recesses provided in the body portion of the nut when supported by said projections, each recess being inclined to the axis of said nut opposite to the inclination of the threads of the nut for limiting the movement of the member therein to one side of an axial plane through the bottom of said recess, the ends of said members having the knife edges projecting beyond the bearing surface of the nut when angularly disposed in a position furthermost from said plane.

5. An element provided with an angularly disposed recess communicating with its engageable surface, a locking member having a knife edge on one end and projections on the opposite end, said projections being pivoted in said recess with the knife edge projecting slightly thereabove when the member is tilted against the side of the recess in a direction in which the recess is tilted and which extends a considerable distance thereabove when tilted against the opposite side of said recess.

6. A member to be retained in locked position with a second member against which a surface of the first member abuts, which includes in combination, a wedge having a knife edge on one end and projections on an opposite end which engage the body portion of said first member so as to be in pivotal relation thereto and disposed in angular relation between the members to permit their relative movement in one direction and to oppose their movement in an opposite direction.

7. A member provided with an aperture which is disposed in angular relation to the axis of the member, in combination with a locking member provided with projections on its central portion which engage the sides of said aperture for pivotal movement therein and having knife edges on its ends which extend slightly from the engageable surfaces of the member when tilted in one direction and which extends a considerable greater distance therefrom when angularly moved in the opposite direction within the aperture.

8. Locking means for a threaded member having a recess communicating with its engaging surface which includes, in combination, a wedge member having a knife edge on one end and projections on the other end which engage the sides of said recess for retaining said member for pivotal movement one side of a plane extending through said projections and parallel to the axis of said member with the knife edge extending slightly above said surface when tilted away from said plane, the said knife edge extending a considerably greater distance thereabove when tilted toward the vertical during the movement of the member, the distance of extension being considerably greater than the lead of the thread of the member for the same movement.

9. A member to be retained in locked position with a second member against which a surface of the first member abuts, which includes in combination a wedge having a knife edge on one end and having projections in spaced relation with said knife edge which engage the body portion of said first member so as to be in pivotal relation thereto, said wedge being disposed in angular relation between the members to permit their relative movement in one direction and to oppose their movement in an opposite direction.

ALBERT STOLL.